Nov. 18, 1941.   H. T. LAMBERT   2,263,505
BRAKE CONSTRUCTION
Filed May 19, 1941   2 Sheets-Sheet 1
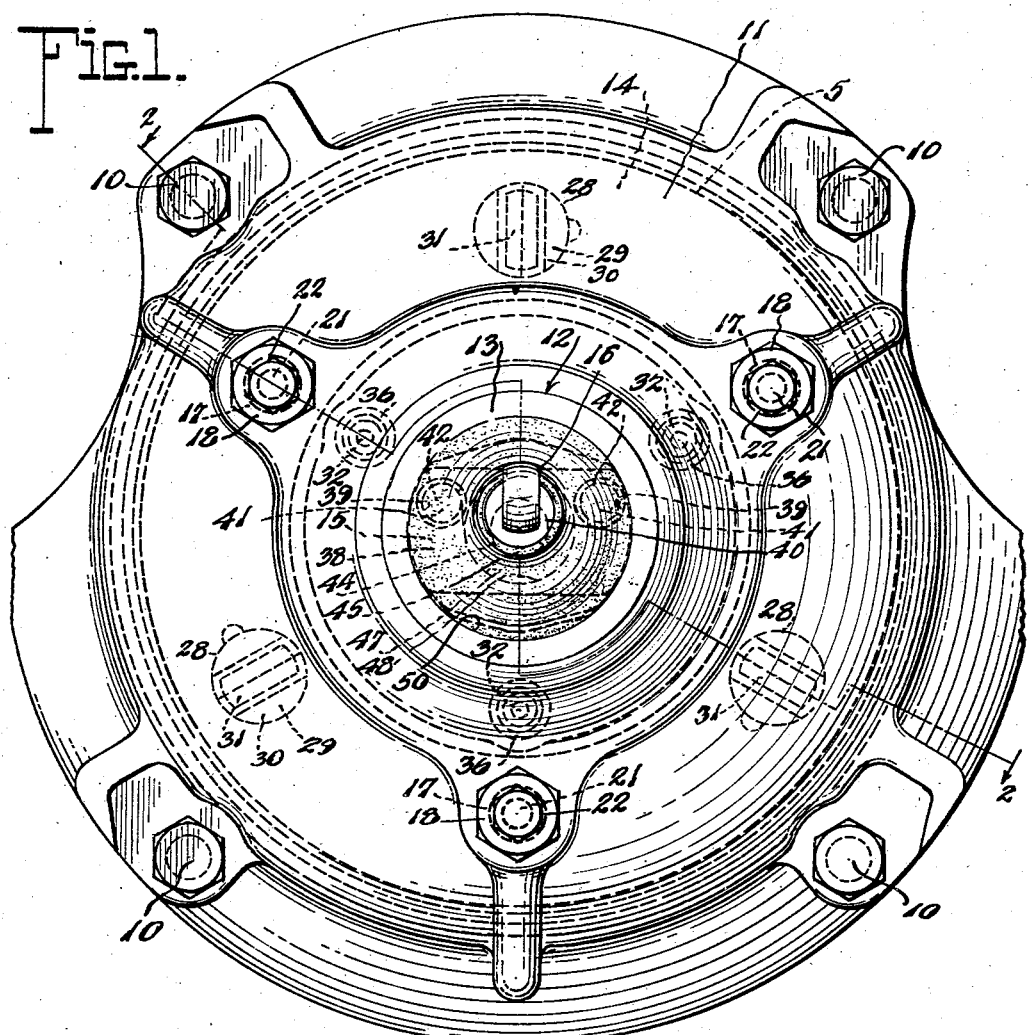
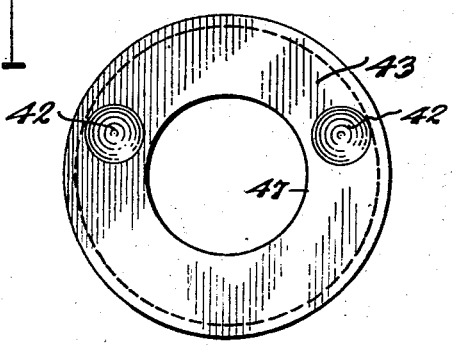
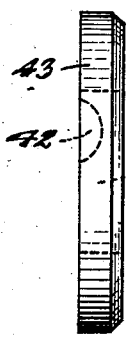
Inventor
H. T. Lambert
Robb & Robb
Attorneys Nov. 18, 1941.   H. T. LAMBERT   2,263,505
BRAKE CONSTRUCTION
Filed May 19, 1941   2 Sheets-Sheet 2
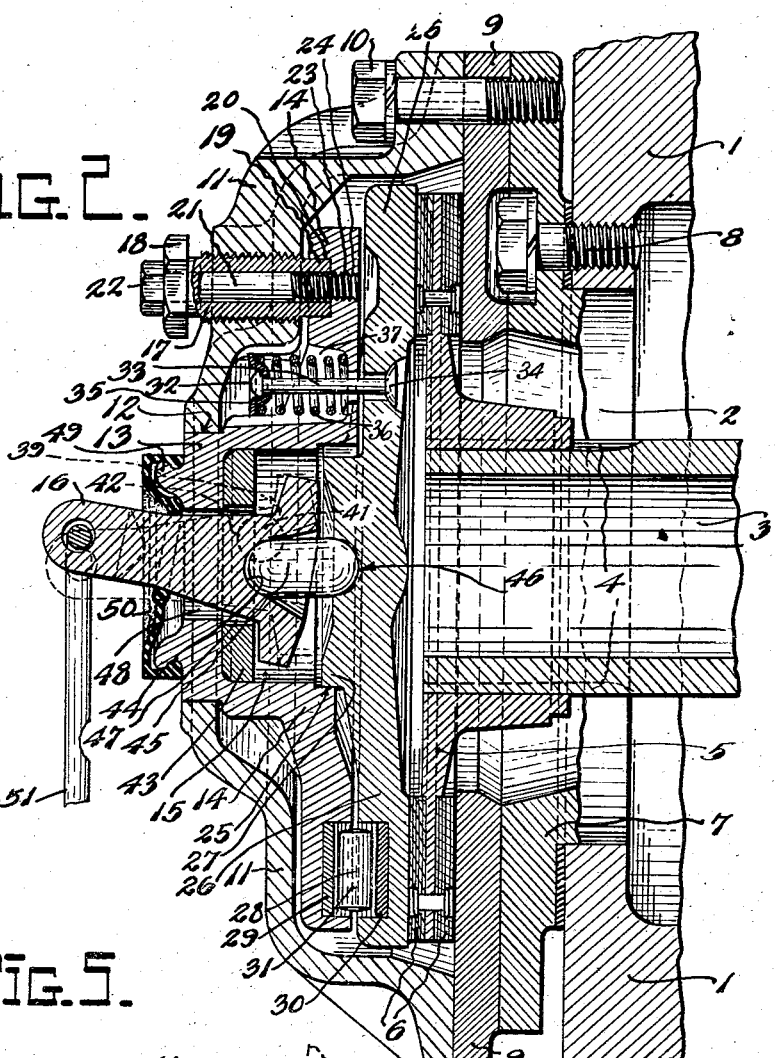
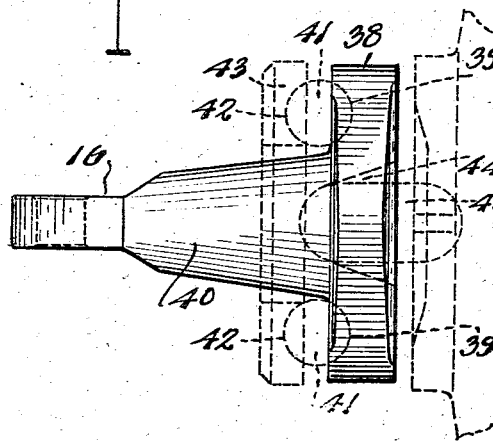
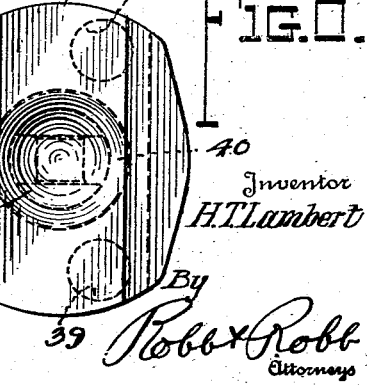
Inventor
H.T.Lambert
By
Robb+Robb
Attorneys Patented Nov. 18, 1941

2,263,505

UNITED STATES PATENT OFFICE 2,263,505

BRAKE CONSTRUCTION

Homer T. Lambert, St. Joseph, Mich.

Application May 19, 1941, Serial No. 394,197

11 Claims. (Cl. 188—72)

This invention relates to improvements in brake constructions, and more particularly to brakes of the disc type which are applicable to tractors, other vehicles, and machinery where relatively heavy duty or service is involved, the parts of the brake mechanism being so constructed as to be especially rugged and sturdy to effectively withstand the stresses and strains in use with heavy vehicles and machinery with a minimum amount of adjustment, repair, or replacement.

An object of my invention is to provide an improved brake assembly of the disc type involving a servo or self-energizing action, and utilizing an improved type of actuating mechanism over that disclosed in my Patent No. 2,225,562, dated December 17, 1940, by applying the preliminary thrust or braking pressure to the center of the braking disc and utilizing special supporting and actuating means for maintaining the braking disc in axial alinement with the member to be braked at all times.

Another object of the invention is to provide a fully enclosed brake construction to prevent dirt and other foreign matter from reaching the braking parts, and utilizing special centralizing means for the energizer or backing plate to support the same independently of the adjusting screws disclosed in my above-identified patent.

A still further object is the provision of a brake in which the thrust is applied to the center of the braking disc by a rockable lever in which means are provided for mounting the lever so that the pivotal axis of the lever may be changed to permit actuation thereof from substantially any angle.

Another object of my invention is the provision of a servo brake in which the braking disc as well as the backing plate are positively maintained in accurate alinement with an enclosing casing, and utilizing special thrust means at the center of the braking disc for moving the latter into braking engagement and employing resilient tie means between the braking disc and backing plate to hold the special thrust means in operative position and tension the braking disc toward the backing plate.

Other and further objects and advantages of the invention will be hereinafter set forth and the novel features thereof defined by the appended claims.

In the accompanying drawings:

Figure 1 is a side elevation of my improved brake construction;

Figure 2 is a sectional view taken approximately on the line 2—2 of Figure 1;

Figure 3 is a detail plan view of the fulcrum plate for the brake actuating lever;

Figure 4 is a side elevation of the fulcrum plate as shown in Figure 3;

Figure 5 is a side elevation of the brake actuating lever, the fulcrum plate for the lever, its spherical fulcrum members, the braking disc, and the thrust pin being shown in dotted lines; and Figure 6 is an end view of the actuating lever shown in Figure 5.

Like reference characters designate corresponding parts in the several figures of the drawings.

Referring particularly to Figure 2, I denotes a support, which may be the differential or transmission housing of a tractor or other vehicle, and formed with an opening 2 through which the hollow shaft 3 projects, this shaft in certain forms of tractor vehicles being the differential shaft.

The shaft 3 is splined at 4 to receive the friction brake ring or member to be braked, as indicated at 5. This member has secured thereto the usual friction linings 6, 6. Secured to the face of the differential housing 1 by cap screws 8 is a bearing housing 7, this being in the form of a circular plate having a central portion projecting into the differential housing 1 to support the bearings. The bearing members between the bearing housing 7 and the shaft 3 are omitted from the drawings.

A stationary braking disc or plate 9 is secured to the plate portion of the bearing housing 7 by cap screws 10. These screws also pass through and secure the brake cover or housing 11 to the bearing housing 7.

The cover 11 is provided at its center with a circular opening 12 to receive the hub portion 13 of the energizer or backing plate 14, and support the same in axial alinement with the differential shaft 3 and the member to be braked. The hub portion 13 of the backing plate is formed with a central recess 15, preferably cylindrical in shape, in which the brake actuating means indicated generally at 16 is located. The adjusting means for the backing or energizer plate 14 is similar to that disclosed in my previously referred to patent, and comprises a plurality of hollow stud members 17 carried by the housing 11, and each provided with a hex-nut 18 at its outer end. The inner end of each stud is reduced in size, as at 19, and projects into a recess 20 formed in the energizer plate 14. Each stud 17 is provided with an axial bore and a bolt 21 disposed in the bore and having a hex-head 22 at its outer end, and threaded at its other end, as indicated at 23, into the threaded opening 24 near the periphery of the energizer plate 14. Loosening of the bolts 21 permits the stud members to be rotated to adjust the energizer plate with respect to the stationary brake disc 9. During the adjustment, the cooperation of the hub portion 13 of the energizer plate 14 with the central opening 12 in the brake housing 11 supports the backing plate against any lateral shifting movement. The inner face of the energizer plate 14 is provided with a circular bearing recess 25. A braking disc 26 is positioned adjacent the energizer plate 14, this disc being formed with a circular central bearing portion or extension 27 extending into the circular bearing recess 25 in the energizer plate 14, and constituting a slide and rotary bearing for centralizing the braking disc 26 both with respect to the energizer plate 14 and the member 5 to be braked.

Interposed between the energizer plate 14 and the braking disc 26 are the servo camming devices 28, which are the same as those employed in my above referred to patent, and consist of opposing camming discs, 29, 30, seated in corresponding recesses in the energizer plate and braking disc and having a camming roller 31 interposed therebetween.

Resilient tie means 32 are provided between the energizer plate 14 and the braking disc 26, each consisting of a rod member 33, having a head 34, passing through the braking disc 26 and bearing against one side thereof. The rod 33 also extends through the energizer plate 14 and carries a removable spring-supporting cap 35. A coil spring 36 is seated at one end on the spring support 35 and extends into a suitable recess 37 formed in the energizer plate 14.

The hub portion 27 of the braking disc 26 receives the thrust from the brake actuating means 16 at its axial center, as seen in the drawings.

The brake actuating means previously referred to comprises a rockable plate 38 mounted within the circular recess 15 in the energizer plate 14. The plate 38 is provided at one side with spherical depressions 39 disposed equi-distant from the handle member 40 and at one side of the center of the plate. Spherical fulcrum members 41 seated in the depressions 39 provide fulcrum means for rockably mounting the lever within the recess 15 of the energizer plate. The spherical members are correspondingly mounted in spherical depressions 42 in a circular fulcrum plate 43 disposed on the bottom of the recess 15 above referred to. The opposite face of the rockable plate 38 is formed substantially at its center with a thrust pin receiving socket or depression 44 to receive one end of the thrust member or toggle pin 45, this pin being seated at its other end in a recess 46 formed in the hub portion 27 at the center of the braking disc 26.

The handle member 40 extends through a circular aperture 47 in the fulcrum plate 43, and also passes through a concentric circular opening 48 through the bottom of the recess 15 in the hub portion 13. The hub portion 13 is formed with an annular overhanging lip 49 to receive a flexible sealing member 50, this member being in the form of a rubber closure having an opening therein to receive the handle portion 40 of the actuating member 16.

In the operation of the brake, the handle member 40 is shifted angularly by any suitable means connected thereto, such as a pull rod 51. This shifting movement rocks the plate 38 on its fulcrum plate 43, and since the toggle pin or thrust member 45 is disposed substantially on the axial center of the rotary member 5 to be braked and the braking disc 26, this disc is shifted into preliminary braking engagement with the member 5 and the central thrust means permits the self-adjusting engagement of the braking disc with the friction linings on the member to be braked, while at the same time the hub portion 27 disposed in the annular bearing surface 25 accurately centralizes the braking disc during the preliminary braking action. The braking disc is picked up, so to speak, by the member to be braked and given a rotative movement which displaces the camming discs 29 and 30 with respect to each other, causing the camming rollers 31 to force the braking disc into servo braking engagement with the member to be braked; and, upon release of the pressure on the actuating member 16, the resilient tie members 32 withdraw the braking disc from the member to be braked and return the braking disc to its initial position adjacent the energizer plate. The tie members 32 also hold the parts of the actuating means 16 in their proper cooperative relation. By utilizing a circular fulcrum plate 43 disposed in the recess 15 and positioning the thrust pin 47 substantially on the axis of rotary movement of the braking disc 26, the fulcrum plate 42 may be adjusted so as to change the plane of swing of the brake actuator operating handle 40. This is very desirable and important, since the adjustment of this fulcrum plate and the operating handle permits the brake to be actuated from substantially any angle, and this adjustment can be easily accomplished without any removal or disassembly of the braking parts. It is also important to note that the central extension 27 of the braking disc 26 projecting into the recessed portion 15 of the energizer plate 14 accurately centers and supports the braking disc so that the thrust pin 45 only functions to exert axial braking thrust on the center of the braking disc.

The brake housing formed with the annular central opening and constituting a centralizing bearing for the energizer plate affords an improvement in that the energizer plate is accurately centered with respect to the brake housing fixed to the support and the braking plate is in turn accurately centered on the energizer plate, providing effective means to maintain these parts in axial alinement with the rotary member to be braked, at all times. The recess receiving the actuator is effectively closed at one side by the cylindrical extension 27 on the braking disc 26 and the concentric openings through the adjustable fulcrum plate 43, and the bottom of the recess through which the operating lever or handle of the braking disc actuator passes being sealed by the flexible rubber closure 50 is also important, since this prevents dirt and foreign matter from going into the brake housing, and particularly into the recess or chamber in which the actuator is located.

What I claim as new and desire to secure by Letters Patent is:

1. In brake mechanism, a rotary member to be braked, a support, a relatively fixed energizer plate disposed at one side of said member to be braked in spaced relation thereto, a braking disc provided with bearing means to journal said disc on said energizer plate for axial and rotary movements, an actuator independent of said journaling means and disposed intermediate the energizer plate and the braking disc, and thrust means operable by said actuator engaging the braking disc centrally thereof to move the same axially into braking engagement with the rotary member to be braked to effect a limited rotary movement of said braking disc, and servo camming means between the energizer plate and said braking disc for producing a braking action by said braking disc incident to the limited rotary movement of said disc.

2. In brake mechanism, a rotary member to be braked, a support, an energizer plate carried by said support having a recessed central portion, an axially shiftable braking disc having a central extension slidably disposed in the recessed central portion of said energizer plate, resilient means tensioning the braking disc towards said energizer plate, an actuator disposed in the recessed central portion of said energizer plate, and thrust means operable by said actuator disposed substantially in alinement with the axis of rotation of the member to be braked and engaging said braking disc at its center to move the said braking disc into braking engagement with the member to be braked.

3. In brake construction, the combination with a rotary member to be braked, of a braking disc-like member movable toward and away from the same, a stationary plate-like member disposed at one side of said braking disc-like member having an axial offset annular flange spaced from the braking disc-like member, an actuator interposed between the braking disc-like member and the annular flange of the stationary plate-like member and rockable transversely to the axis of the rotary member, fulcrum means for the actuator disposed between the actuator and the annular flange of the stationary plate-like member permitting rocking movement of the actuator relative to the braking disc-like member and the stationary plate-like member, and thrust means operable by said actuator interposed between the actuator and the center of the braking disc-like member for exerting axial thrust on the braking disc-like member to move the same into braking engagement with the rotary member to be braked.

4. In brake mechanism, a rotary member to be braked, a support, an energizer plate carried by said support formed with a centrally recessed extension having an aperture therethrough, an axially shiftable braking disc having a central extension slidably disposed in the central recess of the energizer plate extension and formed with a centrally located thrust pin receiving depression facing the recess in the energizer plate, resilient tie means tensioning the disc and plate toward each other, a rockable actuator disposed in the recessed extension of the energizer plate having an operating handle extending through the aperture in said last mentioned recessed extension, fulcrum means for said actuator disposed in the recessed extension of the energizer plate at spaced points at one side of the aperture for said operating handle, said actuator having formed therein a thrust pin receiving depression intermediate the spaced fulcrum points and facing the thrust pin receiving depression in the braking disc and substantially concentric with the axis of rotation of the member to be braked, and a single thrust pin seated at its opposite ends in the thrust pin receiving depressions in the actuator and said braking disc and shiftable by the actuator upon rocking movement thereof to exert axial braking thrust on the braking disc.

5. In brake mechanism, a support, a rotary member to be braked, an energizer plate carried by said support in spaced relation to the member to be braked, and having a central extension formed thereon with a central recess therein, a braking disc disposed between the energizer plate and the member to be braked having an annular extension formed thereon and telescopically received in the recess in the extension on the energizer plate to support said braking disc on the energizer plate in axial alinement with the member to be braked, resilient tie means stressing the braking disc toward said energizer plate, an adjustable actuating lever fulcrumed in the recess in said extension on the energizer plate including a single thrust member operable by said lever and engaging the braking disc at its axial center, and means for adjustably supporting said actuating lever within the recess of the extension on the energizer plate for shifting the position of the pivotal axis of the actuating lever to change the plane of swinging movement of said lever.

6. In brake construction, a rotary member to be braked, a support, an energizer plate adjustably carried by said support in spaced relation to the member to be braked, and formed with a centrally disposed extension having a central recess therein, and an opening extending through the bottom of said recess, a braking disc carried by said energizer plate and axially shiftable toward and away from said member to be braked, a rotatably adjustable fulcrum plate disposed in the recess in the central extension of said energizer plate, an actuating lever rockably carried by said fulcrum plate within the recess having an operating handle extending through the opening through the bottom of the recess in the extension on the energizer plate for rocking the actuating lever, and thrust means between said actuating lever and the central portion of said braking disc operable by actuation of said lever to exert axial thrust on the braking disc when the actuating lever is rocked to effect a braking action between the braking disc and the rotary member to be braked.

7. In brake construction, an axially shiftable rotary member to be braked, a stationary brake ring disposed at one side of the member to be braked, a relatively rotatable axially shiftable braking disc disposed at the other side of the rotary member to be braked, an energizer plate rotatably supporting said relatively rotatable braking disc, servo camming means between the last-mentioned disc and plate to produce servo braking action upon relative rotary movement between said braking disc and energizer plate incident to preliminary braking engagement between said braking disc and the member to be braked, said energizer plate having a cylindrical extension projecting therefrom formed with a central recess and an aperture extending through the bottom of said recess, the longitudinal axes of said recess and aperture being aligned with the rotary axis of the relatively rotatable axially shiftable braking disc, a rotatably adjustable fulcrum plate disposed on the bottom of the recess in the energizer plate extension having a central aperture therethrough and spaced circular depressions at one side of the rotary axis of the relatively rotatable braking disc, an actuator rockably disposed in the recess of the energizer plate comprising a plate having an actuating handle portion extending therefrom through the apertures in the fulcrum plate and the bottom of the recess in the energizer plate extension, said actuator plate having circular depressions formed therein substantially in alinement with and facing the circular depressions in the fulcrum plate, circular fulcrum members between said actuator plate and fulcrum plate seated in the circular depressions in the said plates, a central thrust pin receiving depression formed in the side of the actuator plate opposite the side having said circular depressions therein and substantially on the axis of rotation of the relatively rotatable braking disc, said relatively rotatable braking disc having a thrust pin receiving depression formed therein at its axial center and facing the thrust pin receiving depression in the actuator plate, a thrust pin member having its ends seated in the aforesaid thrust pin receiving depressions in the braking disc and actuator plate, and resilient tie means for tensioning said braking disc toward said energizer plate.

8. In brake construction, a rotary member to be braked, a support, a stationary brake ring carried by said support at one side of the member to be braked, a relatively rotatable axially shiftable braking disc disposed at the other side of the rotary member to be braked, an energizer plate rotatably supporting said relatively rotatable braking disc for axial and rotary movements thereof, servo camming means between the last-mentioned plate and disc to produce servo braking action of said disc on the member to be braked upon relative rotary movement between the said last-mentioned disc and energizer plate incident to preliminary braking engagement between the braking disc and the rotary member to be braked, said energizer plate having an extension projecting therefrom, a brake housing carried by said support enclosing the aforesaid brake parts and having a guide opening therethrough formed to receive the extension projecting from said energizer plate, adjustable securing means between the energizer plate and the brake housing for axially adjusting said energizer plate with respect to the rotary member to be braked, and toggle lever means between the energizer plate and the center of the relatively rotatable braking disc to move the same axially into braking engagement with the member to be braked.

9. In brake construction, a rotary member to be braked, a support, a stationary brake ring carried by said support at one side of the member to be braked, a relatively rotatable axially shiftable braking disc disposed at the other side of the rotary member to be braked, an energizer plate rotatably supporting said relatively rotatable braking disc for axial and rotary movements thereof, servo camming means between the last-mentioned plate and disc to produce servo braking action of said disc on the member to be braked, upon relative rotary movement between the said last-mentioned disc and energizer plate incident to preliminary braking engagement between the braking disc and the rotary member to be braked, said energizer plate having a cylindrical extension projecting therefrom formed with a central cylindrical recess therein having its longitudinal axis coincident with the axis of rotation of the relatively rotatable braking disc and a central aperture through the bottom of said recess, a brake housing carried by said support enclosing the aforesaid brake parts and having a guide opening therethrough formed to slidably receive the extension projecting from said energizer plate, adjustable securing means between said brake housing and the energizer plate for axially adjusting the said last-mentioned plate with respect to the housing, and toggle lever means between the energizer plate and the relatively rotatable braking disc comprising a toggle plate rockably fulcrumed on the energizer plate in said recess in the extension and having an operating lever extending through the central aperture in the bottom of the recess in the energizer plate extension and through the guide opening in the housing to the exterior thereof, and including axial thrust means engaging said braking disc at its axial center to move the same axially into preliminary braking engagement with the member to be braked.

10. In brake construction, a rotary member to be braked, a support, a stationary brake ring carried by said support at one side of the member to be braked, a relatively rotatable axially shiftable braking disc disposed at the other side of the rotary member to be braked, an energizer plate rotatably supporting said relatively rotatable braking disc for axial and rotary movements thereof, servo camming means between the last-mentioned plate and disc to produce servo braking action of said disc on the member to be braked, upon relative rotary movement between the said last-mentioned disc and energizer plate incident to preliminary braking engagement between the braking disc and the rotary member to be braked, said energizer plate having a cylindrical extension projecting therefrom formed with a central cylindrical recess therein having its longitudinal axis coincident with the axis of rotation of the relatively rotatable braking disc and a central aperture through the bottom of said recess, a brake housing carried by said support enclosing the aforesaid brake parts and having a guide opening therethrough formed to slidably receive the extension projecting from said energizer plate, adjustable securing means between said brake housing and the energizer plate for axially adjusting the said last-mentioned plate with respect to the housing, toggle lever means between the energizer plate and the relatively rotatable braking disc comprising a toggle plate rockably fulcrumed on the energizer plate in said recess in the extension and having an operating lever extending through the central aperture in the bottom of the recess in the energizer plate extension and through the guide opening in the housing to the exterior thereof and including axial thrust means engaging said braking disc at its axial center to move the same axially into preliminary braking engagement with the member to be braked, and flexible sealing means extending across the aperture in the energizer plate extension having an opening therethrough to sealably engage the operating handle for the toggle lever means.

11. In brake construction, a support, a rotary member to be braked, a stationary brake ring surrounding said member to be braked, a brake housing secured to said support and having a circular guide opening formed therein, an energizer plate having a centrally located hub-like extension formed thereon projecting into the aforesaid guide opening, a plurality of adjusting bolts carried by said brake housing at spaced points radially outward of the central guide opening in the housing for adjustably supporting the energizer plate against axial movement on the housing, said energizer plate having a central recess formed therein extending into the hub-like extension with the bottom disposed in a plane at right angles to the axis of rotation of the rotary member to be braked and having a central opening therethrough, a flat fulcrum plate positioned against the bottom of said recess having a central aperture therethrough and rotatably adjustable in said recess, an actuator fulcrum on said plate at spaced points at one side of the axis of rotation of the rotary member to be braked, and having an operating handle intermediate the fulcrum points and passing through the openings located in the fulcrum plate, the hub-like extension of the energizer plate, and the brake housing, a relatively rotatable braking disc having a central supporting extension slidably and rotatably fittting the central recess in the energizer plate, thrust means between the actuator and the braking disc comprising an elongated thrust pin disposed with its longitudinal axis substantially in alinement with the rotary axis of the braking disc and the rotary member to be braked and engaging said braking disc at its center, resilient tie means between the energizer plate and said braking disc tensioning said disc toward said energizer plate, and servo camming means between said energizer plate and braking disc operable by relative rotation between said last plate and disc to produce servo braking action.

HOMER T. LAMBERT.